Aug. 17, 1965     H. G. WHITFIELD     3,200,935
ELEVATOR
Filed May 31, 1963     4 Sheets-Sheet 1
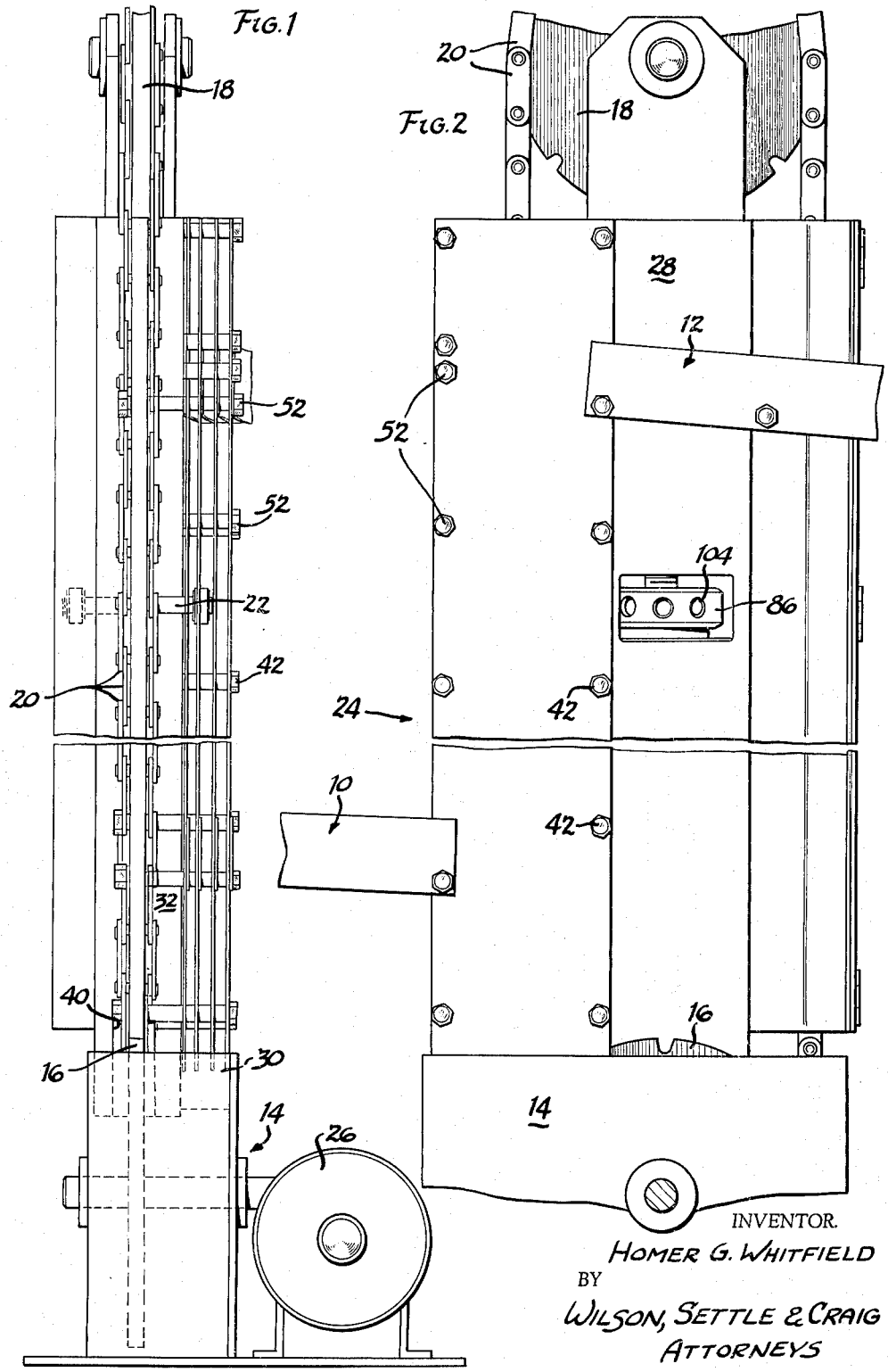
INVENTOR.
HOMER G. WHITFIELD
BY
WILSON, SETTLE & CRAIG
ATTORNEYS

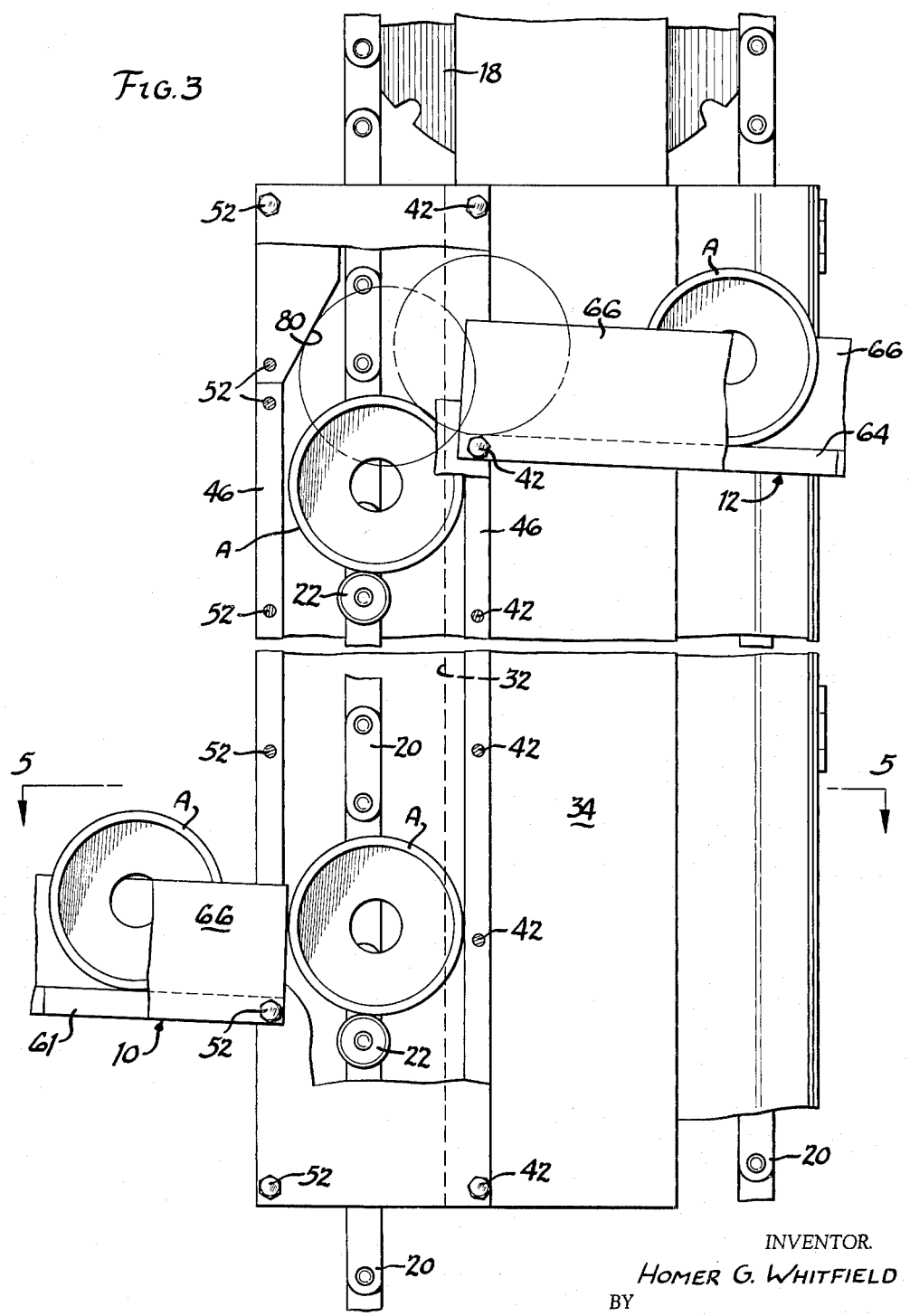

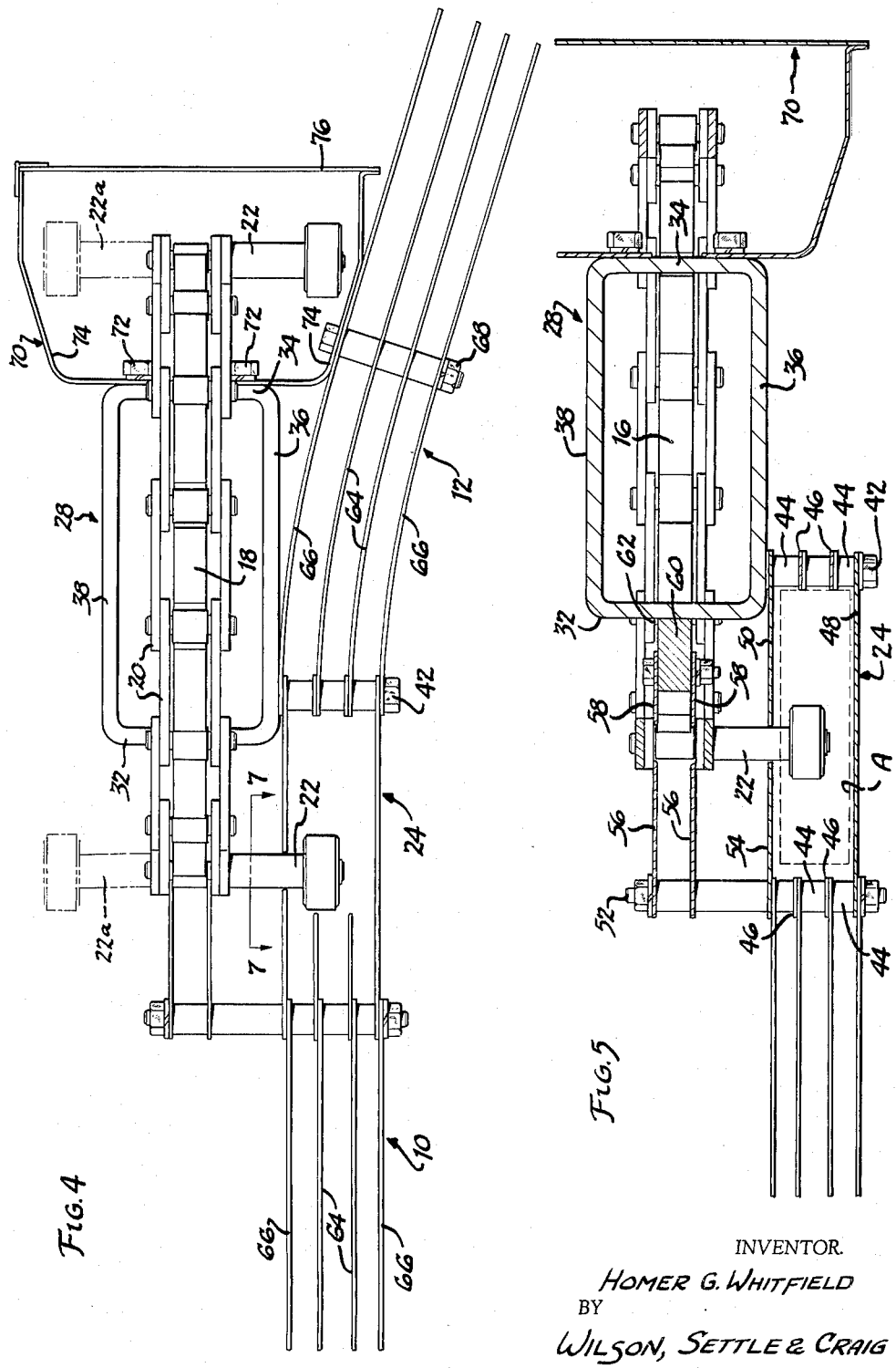

INVENTOR.
HOMER G. WHITFIELD
BY
WILSON, SETTLE & CRAIG
ATTORNEYS

__United States Patent Office__

3,200,935
Patented Aug. 17, 1965

3,200,935
ELEVATOR
Homer G. Whitfield, Clarkston, Mich., assignor to Hydromation Engineering Company, Livonia, Mich., a corporation of Michigan
Filed May 31, 1963, Ser. No. 284,494
7 Claims. (Cl. 198—171)

This invention relates to article handling apparatus, and more particularly to endless chain elevators employed in gravity conveyor systems to elevate conveyed articles from one section of the conveyor system to another.

In article elevators of the type with which the present invention is concerned, an endless conveyor chain is operatively trained about vertically spaced upper and lower end sprockets, one of the sprockets being driven in a direction such that the operative or carrying run of the chain is driven upwardly while the return run is driven downwardly. An article-guiding track assembly is mounted at one side of the carrying run of the chain and extends in parallel relationship to the carrying run to guide articles from an article inlet located at the lower end of the carrying run to an article outlet usually located near the upper end of the carrying run. Articles are gravitationally fed into the interior of the article-guiding track through the inlet and laterally projecting pusher elements mounted at spaced intervals on the chain are elevated, by movement of the chain, into engagement with the lower surface of the article to drive the article upwardly along the track to the article outlet. A stationary cam located opposite the article outlet deflects the article being elevated from its pusher element onto a gravity conveyor chute which extends from the outlet. A typical example of an elevator of the aforementioned type is disclosed in United States Patent No. 2,924,325 granted February 9, 1960 to J. G. Kay et al.

Elevators of the particular type under consideration are especially adapted to convey cylindrical parts, such as gear blank for example, because the conveyed part can then roll along a guiding surface or rail of the article guiding track. The pusher element, in such a case, can be provided with a roller which is spaced from the track or rail upon which the article rolls by a distance such that the line of action of the center of gravity of the article passes between the roller and the track. This over-center relationship between the center of gravity of the article and the axis of rotation of the roller on the article-engaging element of the chain requires, for most efficient operation, that the article be fed into the track from the side of the track opposite the track surface upon which the conveyed article will roll as it is elevated. This requires that during the entry of the article into the track, the center of gravity of the article pass through and beyond the path of movement of the article-engaging roller axis. This arrangement is desirable so that there is no tendency of the roller to force the article back into the entry chute as it moves into underlying engagement with the article.

In most cases, the direction of exit of the article is chosen to be the reverse of that in which the article enters to avoid interference between the outlet chute and the path of movement of the article-engaging rollers as they pass downwardly along the return run of the chain. This particular arrangement is not the most efficient since it results in a direct and complete reversal of the general direction of movement of the part through the conveyor system.

Accordingly, it is one object of the present invention to provide an endless chain elevator of the type described above wherein articles may enter and leave the elevator in movement in the same general direction.

Because of the 180° reversal of movement of the article in entry and exit in prior art elevators of this type, most of the prior art elevators are restricted to elevating the parts along a true vertical path. Because the prior art arrangements require that the part enter and leave the elevator from the same side, elevating of the parts along a path inclined to the vertical would require the parts to change direction through an angle of more than 90° either on entry or exit.

Accordingly, it is another object of the present invention to provide an endless chain elevator of the general type described above which can elevate parts or conveyed articles along a path inclined to the vertical without requiring the parts to change direction by more than 90° on entry and exit.

Still another object of the invention is to provide an article elevator of the type described above having a chain-tensioning arrangement resiliently tensioning the chain in a fashion such that the possibility of jamming of the elevator by a malformed part is substantially reduced.

Other objects and features of the invention will become apparent by reference to the following specification and to the drawings.

In the drawings:

FIGURE 1 is a front elevational view of an apparatus embodying the present invention;

FIGURE 2 is a detail side elevational view, with certain parts broken away, of the apparatus of FIG. 1;

FIGURE 3 is a detail side elevational view, with certain parts broken away or omitted, of portions of the apparatus of FIG. 1;

FIGURE 4 is a top plan view of the apparatus of FIG. 1;

FIGURE 5 is a detail cross-sectional view taken on line 5—5 of FIG. 3;

Figure 6:
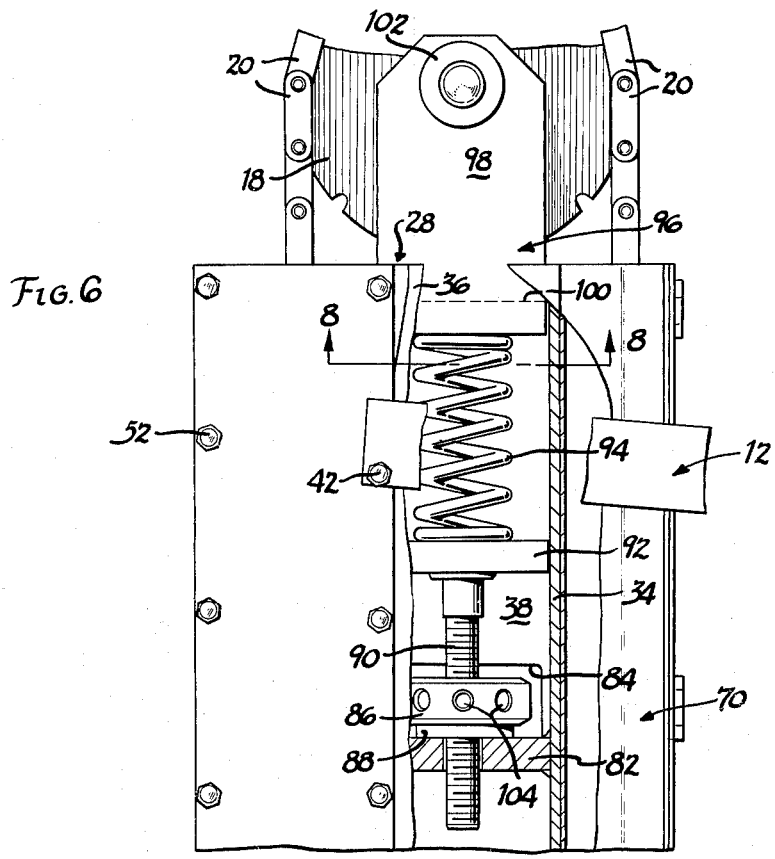
FIGURE 6 is a detail side elevational view, with certain parts broken away or omitted, showing details of the upper sprocket mounting assembly.

The apparatus disclosed in the drawings is employed, referring to FIGURES 1 and 2, to gravitationally receive articles from an infeed conveyor chute, designated generally 10, and to elevate the articles to a discharge chute 12 which gravitationally conveys the articles away from the elevator. The elevator structure itself includes a frame designated generally 14 which rotatively supports a drive sprocket 16 and an upper end sprocket 18, about which are operatively trained an endless chain 20. Chain 20 carries a plurality of spaced, laterally projecting pusher rollers 22, which project horizontally from one side of the chain into an article guiding track assembly designated generally 24 which guides articles being elevated from inlet chute 10 to outlet chute 12. Chain 20 is driven in article-conveying movement by means of a drive motor 26 which is operatively coupled to drive sprocket 16 in a direction such that the operative run of the chain moves upwardly to elevate articles within track assembly 24.

Track assembly 24 and upper sprocket 18 are supported along an elongate hollow tubular post 28 which is fixedly secured, as by welding and brackets 30 to the base of frame 14. As best seen in FIGURES 4 and 5, post 28 is of generally rectangular transverse cross-section, having spaced front and rear walls 32 and 34 and spaced parallel side walls 36 and 38. Post 28 may be slotted as at 40, if necessary to provide the necessary clearance for drive sprocket 16.

Referring now particularly to FIGURE 5, article guiding track assembly 24 consists of a group of flat metallic strips or plates which are held in assembled relationship with each other by means of bolts and spacers 42 and 44, the bolts 42 being threaded directly into side wall 36 of post 28. The relative arrangement of the metallic strips or plates to each other is dependent upon the shape of the article being handled by the track assembly. In the particular machine disclosed in the drawings, the article being handled by the machine is a relatively flat cylindrical gear blank shown in broken line at A in FIGURE 5. In this particular instance, two sets of relatively narrow strips 46 are held in spaced relationship to each other so that their inner or left-hand edges as viewed in FIGURE 5 form a rail up which the cylindrical parts A roll as they are pushed by pusher elements 22 on chain 20 (see FIG. 3). To maintain the articles A in operative alignment with track strips 46, an outer side plate 48 and an inner side plate 50 are mounted at the inner and outer ends of bolts 42 to project forwardly of the posts at opposite sides of the article as the article moves up track strips 46. At the outer edges of outer guide plate 48, a second series of threaded studs 52 are mounted along the outer edge of side plate 48, spacers 44 again serving to transversely locate a pair of track strips 46. A pusher guide plate 54 cooperates with inner guide plate 50 to define a relatively narrow slot through which the pusher elements 22 project into the track assembly.

Also mounted upon studs 52 are chain guide plates 56. A second set of chain guide plates 58 are mounted to engage the inner side of the chain upon a guide block fixedly secured to front end wall 32 as by welding at 62.

Inlet chute 10 and outlet chute 12 are constructed in substantially the same manner as is track assembly 24, the respective chutes including a pair of relatively narrow guide rails 64 disposed on edge and a pair of wider side guide plates 66 which are spaced from each other by suitably dimensioned spacers received on bolts such as 68 (FIG. 4).

A chain housing designated generally 70 is fixedly secured to rear end wall 34 as by bolts 72, to enclose the downwardly travelling return run of chain 20. Housing 70 includes a pair of side walls 74 which are inclined rearwardly and outwardly from the respective side walls of tubular post 28, the inclination of side walls 74 being required to enable the housing to enclose the laterally projecting pusher elements 22 on the return run of the chain. Preferably, the rearward side of housing 70 is closed by a door 76 to provide access to the chain in the return run region.

As indicated by the broken line showing of pusher elements 22a in FIGURE 4, the assembly may be provided with track assemblies and pusher elements at both sides of post 28. For this reason, housing 70 is constructed in the cross-sectional configuration shown so that the same housing may be employed with elevators employing pusher assemblies projecting from either or both sides of chain 20. The inclined portion 74 of the housing side walls serve as a mounting surface for outlet chute 12, the transverse flexibility of the strips and plate 64 which constitute the outlet chute being such that the strips and plates may be flexed in the fashion shown in FIGURE 4, so that the innermost plate 64 is in face-to-face contact at its forward end with side wall 36 and is then flexed outwardly into tangential face-to-face contact with the outer surface of inclined side wall 74 of housing 76. As can be appreciated from FIGURE 4, the curvature of outlet chute 12 is gradual enough to avoid interference or binding between the side walls 66 of the chute and the articles A which gravitationally roll down the chute 12.

As best seen in FIGURE 4, the spacing between the forward edges of rails 46 of track assembly 24 and the path of movement of the carrying run of chain 20 is such that the cylindrical articles A being conveyed are supported from rollers 22 with the centers of the articles lying between the path of movement of the chain and rails 46. In other words, articles rolling into track assembly 24 have their centers carried beyond the center of the supporting roller 22 of the pusher element. As the articles are elevated to the level of discharge chute 12, an inclined cam surface 80 on the track assembly cams the article to the right as viewed in FIGURE 3 to transfer the article from track assembly 24 to outlet chute 12.

Figure 8:
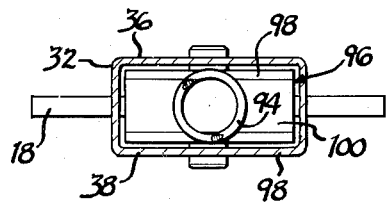
FIGURE 8 is a detail cross-sectional view taken on line 8—8 of FIG. 6.
Figure 7:
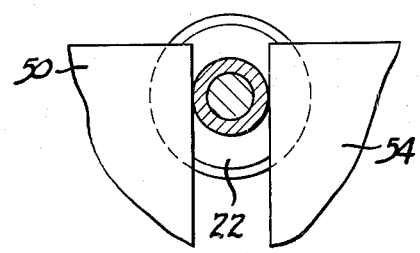
FIGURE 7 is a detail cross-sectional view taken on line 7—7 of FIG. 4.

Referring now to FIGURES 6 and 8, the configuration of post 28 is not only peculiarly adapted to support the track and chute assemblies relative to the chain, but also provides a convenient arrangement for tensioning chain 20. To this end, referring to FIGURE 6, a stationary plate 82 is fixedly mounted in the interior of post 28 as by welding. An opening 84 is cut in side wall 36 not only for access to plate 82 to secure it within post 28, but also to provide access to an adjusting nut 86 which is supported upon the upper surface of plate 82 as by a thrust bearing 88. An adjustment screw 90 is threadably received within nut 86 and carries a plate 92 at its upper end. The peripheral edge of plate 92 conforms to the internal shape of post 28 so that plate 92 is locked against rotation, but can slide up and down within the interior of post 28.

A compression spring 94 is mounted upon the top of plate 92 and bears against the lower surface of a sprocket support assembly designated generally 96 which includes a pair of spaced side plates 98 and a lower plate 100. Again, as best seen in FIGURE 8, the transverse shape of support assembly 96 is such that it can slide up and down within post 28 but is maintained in the desired alignment. Each of support plates 98 carries a bearing assembly 102 which rotatively receive the shaft of sprocket 18.

From the foregoing description, it is believed apparent that compression spring 94 biases support assembly 96 and thus sprocket 18, upwardly, thereby applying tension to chain 20. The magnitude of the tension applied is adjusted by rotating adjusting nut 86 to raise or lower the plate within the tube within post 28, thus increasing or decreasing the compressive force exerted by spring 94 against sprocket support assembly 96. A series of radial bores, such as 104, in nut 86 is provided to accept the end of a rod, not shown, to assist in rotating nut 86.

Since drive motor 26 is coupled to lower sprocket 16, and sprocket 16 rotates about a stationary axis, the resilient mounting of upper sprocket 18 not only serves as a means of applying the desired degree of tension to chain 20, but also assists in avoiding jams occasioned by the entrance of malformed parts into track assembly 24 from infeed chute 10. In the event a part jams at the entrance to track assembly 24, that portion of the carrying run of the chain below the jammed part becomes slack, thus permitting the chain to move transversely in one direction or another to pass to one side or another of the center line of the jammed article. This action causes the pusher assembly either to suck the part in to the track assembly or to force the part back into the entrance from infeed conveyor 10. The tension applied to the chain during the jamming is absorbed by spring 94, thus preventing snapping of the chain. If desired, a motor-controlling limit switch may be provided to automatically cut out the drive motor in the event a jammed part tensions the chain to a degree such that support assembly 96 is pulled downwardly beyond a selected point.

While the embodiment of the invention disclosed in the drawings is directed to an elevator in which the articles are elevated along a true vertical path and the exit chute extends rearwardly beyond the return run of the chain, the structural relationship of the apparatus is such that neither of the foregoing features are designed limitations. It is believed apparent that, as in prior art elevators, the outlet chute may, if desired, extend forwardly. In such a situation, the inlet chute may enter the track either from the front as disclosed or from the rear in the same fashion that the outlet chute leaves in the disclosed embodiment. Further, because the inlet and outlet chutes may be located on opposite sides of the path along which the articles are elevated, the path of elevation may be inclined from the vertical without requiring the articles to change direction by more than 90° on entry or exit.

While one embodiment of the invention has been described in detail, it will be apparent to those skilled in the art that the described embodiment may be embodied. Therefore, the foregoing description is to be considered exemplary rather than limiting, and the true scope of the invention is that described in the following claims.

I claim:

1. In an article elevator having a frame, a pair of end sprockets mounted on said frame for rotation in a common vertical plane, an endless chain operatively trained about said end sprockets and having a carrying run and a return run extending between said sprockets in spaced relationship to each other within said common plane, article-engaging means mounted at spaced locations on said chain and projecting from one side of said chain, and means for driving said chain to move said chain upwardly along its carrying run to elevate articles engaged by said engaging means; the improvement wherein said frame comprises an elongate hollow tubular post having front and rear end walls and spaced side walls extending longitudinally between said sprockets, the front end wall of said post being disposed rearwardly of the carrying run of said chain and the rear end wall being located in front of the return run, means defining an article inlet adjacent the lower end of said post and an article outlet adjacent the upper end of said post, article guide means mounted on one side wall of said post and defining upwardly extending article guiding passage through which articles are guided upwardly along said post from said article inlet to said article outlet, said article inlet and outlet being located on opposite sides of said passage whereby articles are discharged from said passage in the same general direction as that in which they entered.

2. In an article elevator having a frame, a pair of end sprockets mounted on said frame for rotation in a common vertical plane, an endless chain operatively trained about said end sprockets and having a forwardly disposed carrying run and a rearwardly disposed return run extending between said sprockets in spaced relationship to each other within said common plane, article-engaging means mounted at spaced locations on said chain and projecting laterally from one side of said chain, and means for driving said chain to move said chain upwardly along its carrying run to elevate articles engaged by said engaging means; the improvement wherein said frame comprises an elongate hollow tubular post having front and rear end walls and spaced side walls extending longitudinally between said sprockets, the front end wall of said post being disposed rearwardly of the carrying run of said chain and the rear end wall being located in front of the return run, article guide means mounted on one side wall of said post at one side of said front wall for guiding articles upwardly along said post from an article inlet near the lower end of said post to an article outlet adjacent the upper end of said post, an article inlet chute for feeding articles to said inlet, an outlet chute for receiving articles from said article outlet and gravitationally conveying the articles from said outlet, one of said chutes extending forwardly from said guide means and the other of said chutes being mounted upon said one side wall and extending rearwardly from said guide means beyond the return run of said chain.

3. In an article elevator having a frame, a pair of end sprockets mounted on said frame for rotation in a common vertical plane, an endless chain operatively trained about said end sprockets and having a carrying run and a return run extending between said sprockets in spaced relationship to each other within said common plane, article-engaging means mounted at spaced locations on said chain and projecting from one side of said chain, and means for driving said chain to move said chain upwardly along its carrying run to elevate articles engaged by said engaging means; the improvement wherein said frame comprises an elongate hollow tubular post having front and rear end walls and spaced side walls extending longitudinally between said sprockets, the front end wall of said post being disposed rearwardly of the carrying run of said chain and the rear end wall being located in front of the return run, article guide means mounted on one side wall of said post to guide articles upwardly along said post from an article inlet near the lower end of said post to an article outlet adjacent the upper end of said post, outlet chute means mounted on said one side wall of said post for receiving articles from said article outlet and conveying the articles rearwardly beyond the return run of said chain, end sprocket support means slidably received within the upper end of said post, and resilient means in said post for adjustably biasing said support means upwardly relative to said post to apply a selected tension to the chain.

4. Article handling apparatus comprising a frame, a drive sprocket mounted in said frame for rotation in a vertical general plane, an elongated hollow tubular frame member fixedly mounted at its lower end on said frame, said member having spaced side walls symmetrically disposed on opposite sides of said vertical general plane and front and rear end walls, an end sprocket mounted for rotation at the upper end of said tubular member in co-planar relationship with said drive sprocket, an endless chain operatively trained about said sprockets and having a carrying run disposed in front of said front end wall and a return run disposed rearwardly of said rear end wall, means for driving said drive sprocket in a direction driving the carrying run of said chain upwardly along said front end wall, an article guiding track assembly mounted on one of said side walls at one side of said front end wall and extending upwardly along said tubular member from a forwardly opening article inlet to a rearwardly opening article outlet, a plurality of article engaging pusher means mounted at spaced locations on said chain and projecting laterally therefrom for pushing articles along said track from said inlet to said outlet as said pusher means are driven along the carrying run of said chain, and article receiving chute means mounted on said one side wall of said tubular member for receiving articles from said outlet and gravitationally conveying the articles rearwardly beyond the return run of said chain.

5. Article handling apparatus comprising a frame, a drive sprocket mounted in said frame for rotation in a vertical general plane, an elongated hollow tubular frame member fixedly mounted at its lower end on said frame, said member having spaced side walls symmetrically disposed on opposite sides of said vertical general plane and front and rear end walls, an end sprocket mounted for rotation at the upper end of said tubular member in co-planar relationship with said drive sprocket, an endless chain operatively trained about said end sprockets and having a carrying run disposed in front of said front end wall and a return run disposed rearwardly of said rear end wall, means for driving said drive sprocket in a direction driving the carrying run of said chain upwardly along said front end wall, an article guiding track assembly mounted on said tubular member at one side of said front end wall and extending upwardly along said tubular member from a forwardly opening article inlet to a rearwardly opening article outlet, a plurality of article engaging pusher means mounted at spaced locations on said chain and projecting laterally therefrom for pushing articles along said track assembly from said inlet to said outlet as said pusher means are driven along the carrying run of said chain, an elongate housing mounted on said rear wall to enclose at least the upper portion of the return run of said chain and the article engaging pusher means projecting therefrom, said housing having side walls inclined rearwardly and outwardly from the respective side walls of said tubular member, and article receiving chute means mounted on said one side wall of said tubular member and on the inclined side wall of said housing for receiving articles from said outlet and gravitationally conveying the articles rearwardly beyond said housing.

6. Article handling apparatus as defined in claim 5, wherein said chute means comprise a plurality of spaced elongate flat transversely flexible strips disposed on edge in transversely spaced relationship to each other to define an article guiding track, said strips being fixedly secured at their forward end with one strip in face-to-face contact with said one side wall of said housing and being flexed rearwardly and outwardly from said side wall to dispose said one of said strips in flat tangential face-to-face contact with the inclined housing side wall.

7. Article handling apparatus comprising a frame, a drive sprocket mounted in said frame for rotation in a first general plane, an elongate hollow tubular frame member fixedly mounted at one end on said frame and extending longitudinally therefrom, said member having spaced side walls symmetrically disposed on opposite sides of said general plane and opposed end walls, an end sprocket located adjacent the other end of said tubular member, support means slidably received within said other end of said tubular member for guided longitudinal movement relative to said member, means on said support means supporting said end sprocket for rotation adjacent said other end of said tubular member in coplanar relationship with said drive sprocket, an endless chain operatively trained about said sprockets and having a carrying run disposed along one of said end walls and a return run disposed along the other of said end walls, an article guiding track assembly mounted on one of said side walls for guiding articles longitudinally along one side of said one end wall from an article inlet located adjacent said drive sprocket to an article outlet located adjacent the other end of said tubular member, a plurality of article engaging pusher means projecting laterally from said chain for pushing articles along said track means, means for driving said drive sprocket in a direction such that said article engaging means drive articles along said track means from said inlet to said outlet, and compression spring means seated within said tubular member resiliently urging said support means outwardly from said other end of said tubular member to resiliently tension said chain.

References Cited by the Examiner
UNITED STATES PATENTS 1,415,869 5/22 Fischer _____ 198—208 X
2,924,325 2/60 Kay _____ 198—168

SAMUEL F. COLEMAN, *Primary Examiner.*

ERNEST A. FALLER, *Examiner.*